US 12,235,742 B2

(12) United States Patent
Reddy Naga et al.

(10) Patent No.: US 12,235,742 B2
(45) Date of Patent: Feb. 25, 2025

(54) CONTINUOUS MANAGEABILITY OF KUBERNETES CLUSTERS

(71) Applicant: Dell Products L.P., Round Rock, TX (US)

(72) Inventors: Vijayasimha Reddy Naga, Georgetown, TX (US); Mukesh Sharma, Pune (IN)

(73) Assignee: Dell Products L.P., Round Rock, TX (US)

( * ) Notice: Subject to any disclaimer, the term of this patent is extended or adjusted under 35 U.S.C. 154(b) by 62 days.

(21) Appl. No.: 18/308,174

(22) Filed: Apr. 27, 2023

(65) Prior Publication Data
US 2024/0362128 A1 Oct. 31, 2024

(51) Int. Cl.
*G06F 11/20* (2006.01)
*G06F 8/61* (2018.01)

(52) U.S. Cl.
CPC ............ *G06F 11/2025* (2013.01); *G06F 8/61* (2013.01); *G06F 2201/85* (2013.01)

(58) Field of Classification Search
CPC ............... G06F 11/2025; G06F 11/203; G06F 11/2033; G06F 2201/85
USPC ........................................................ 714/4.11
See application file for complete search history.

(56) References Cited

U.S. PATENT DOCUMENTS

| | | | |
|---|---|---|---|
| 9,575,738 B1* | 2/2017 | Chopra | G06F 8/60 |
| 11,675,678 B1* | 6/2023 | Sharma | G06F 11/203 |
| | | | 714/4.11 |
| 2012/0047394 A1* | 2/2012 | Jain | G06F 11/2028 |
| | | | 714/E11.073 |
| 2016/0188425 A1* | 6/2016 | Duggana | H04L 41/0668 |
| | | | 714/4.11 |
| 2019/0317824 A1* | 10/2019 | Mani | G06F 9/5077 |
| 2024/0231873 A1* | 7/2024 | Jigalur | G06F 9/45558 |

* cited by examiner

*Primary Examiner* — Chae M Ko
(74) *Attorney, Agent, or Firm* — Dergosits & Noah LLP; Todd A. Noah

(57) ABSTRACT

A system for continuous manageability of Kubernetes clusters is described. A system identifies a node, in a cluster of nodes, which failed to communicate with the cluster of nodes. The system identifies an application, which executed on the identified node, and which enabled continuous availability of cluster management for nodes in the cluster until when the identified node failed. The system identifies another node, which is already in the cluster of nodes, and which satisfies a prerequisite for executing the identified application, as a replacement node for the identified node that failed. The system installs the identified application on the replacement node in the cluster. The system enables, by the replacement node executing the identified application, continuous availability of cluster management for multiple nodes in the cluster.

20 Claims, 5 Drawing Sheets

CONTINUOUS MANAGEABILITY OF KUBERNETES CLUSTERS

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

Data storage systems, including secondary storage data platforms such as PowerProtect Data Domain, are challenged with ever growing security and availability constraints combined with performance objectives, which are often defined by service level agreements. FIG. 1 illustrates a diagram of an example system 100 for a secondary storage data platform, in which a backup (and restore) application 102 can create backup files for data objects generated by enterprise applications 104 in a client device 106, and can store the backup files on a primary data storage platform 108, such as a primary data domain system, which then can replicate the backup files to a secondary data storage platform 110, such as a disaster recovery data domain system. One way for such a distributed system to achieve higher availability is by running countless copies, or replicas, of its services distributed across geographies. This means that the distributed system has to address challenges such as keeping a large number of servers up to date with the latest operating system patches, ensuring that these servers are all running the correct version of the distributed system's services, preventing configuration drift across all the servers, orchestrating rollouts of new code and configurations, and handling network partitions between servers.

Kubernetes is an open-source container orchestration system for automating software deployment, scaling, and management. Kubernetes' suitability for running and managing large cloud-native workloads has led to its widespread adoption as high availability distributed systems. A Kubernetes cluster of nodes includes at least two nodes executing a control plane to ensure high availability of the control plane instances, includes an odd number of nodes supporting an etcd data store instance to ensure a quorum of the etcd data store instances, and includes a minimum of three nodes supporting the etcd data store instances to ensure high availability of the etcd data store.

The manageability of a Kubernetes cluster may become impaired if the failure of a node causes the Kubernetes cluster to lose the quorum needed for the etcd data store or to lose the high availability of the control plane. The faulty nodes could be replaced manually, or new nodes could be added manually, to reinstate the high availability of the control plane and/or reinstate a quorum for the etcd data store, but until that point in time the Kubernetes cluster is locked down for any kind of workload management. Adding a number of new nodes to replace failed nodes works well for a cloud or a virtualized solution.

However, for an on-premise bare-metal Kubernetes cluster, the situation is not easy for the addition of new nodes to rebuild high availability of the control plane or a quorum for the etcd data store, it involves shipping the replacement system(s) and there could be considerable wait time, such that the Kubernetes cluster cannot quickly or easily return to a manageable state, which is a common problem with no proven or well-established solutions. Prior attempted solutions and/or existing technologies offer no self-healing methods, as they only include means to identify failures of nodes and failures within nodes, but a manual intervention is always expected and required to correct issues.

DETAILED DESCRIPTION

Figure 1:
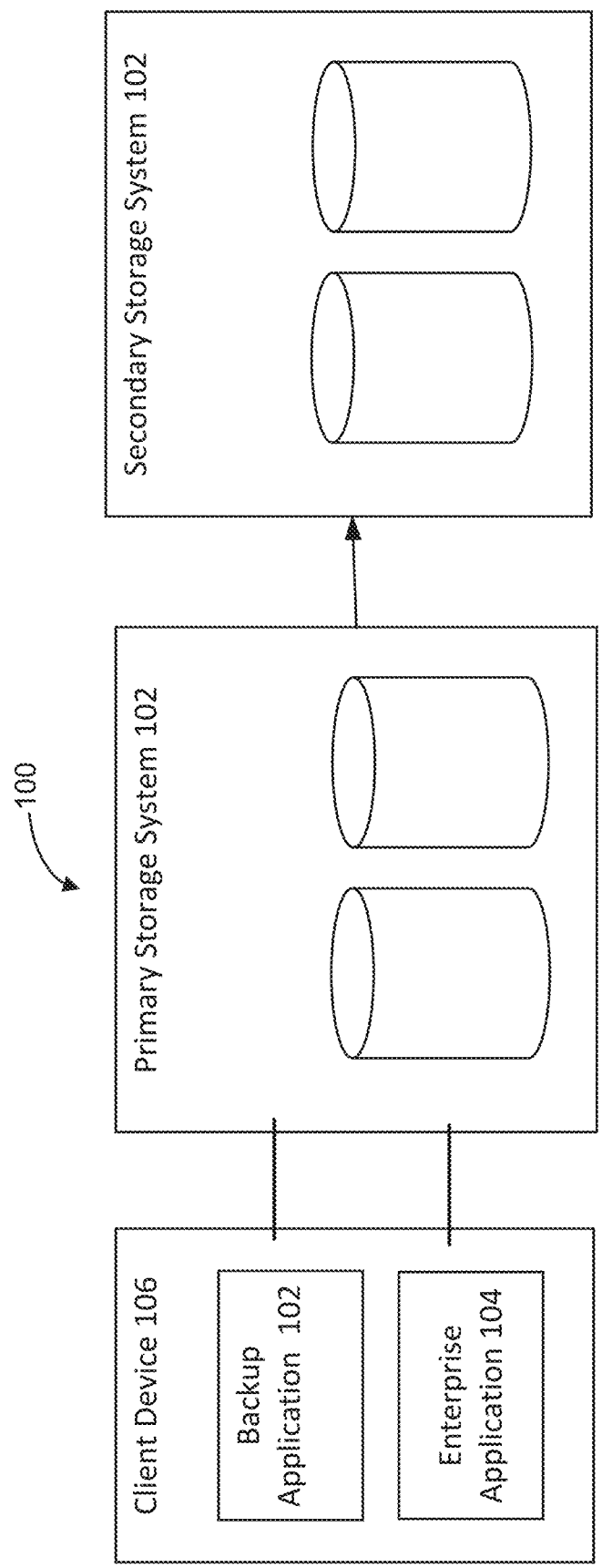
FIG. 1 illustrates a block diagram of an example system which includes a primary storage data platform and a secondary storage data platform.

Some data protection appliances are built on top of a common management and orchestration platform that provides the functionality for management of the infrastructure and the Kubernetes layers. Such platforms currently lack out of the box methods to automatically resolve these challenges, especially without disruption to the workload.

Embodiments herein provide continuous manageability of Kubernetes clusters. A system identifies a node, in a cluster of nodes, which failed to communicate with the cluster of nodes. The system identifies an application, which executed on the identified node, and which enabled continuous availability of cluster management for nodes in the cluster until when the identified node failed.

Then the system identifies another node, which is already in the cluster of nodes, and which satisfies a prerequisite for executing the identified application, for the identified node that failed. Next, the system installs the identified application on the replacement node in the cluster. Finally, the system enables, by the replacement node executing the identified application, continuous availability of cluster management for multiple nodes in the cluster.

For example, a status monitor identifies that the fourth node and the eighth node, in a Kubernetes cluster of ten nodes, have failed to communicate with the cluster. The system accesses an available etcd data store which specifies that the fourth node executed a etcd data store instance that enabled continuous availability of cluster management for the cluster nodes until the fourth node failed, and that the eighth node executed a control plane instance that enabled continuous availability of cluster management for the cluster nodes until the eighth node failed. A resolver identifies which of the eight remaining nodes in the cluster of ten nodes satisfy a prerequisite to execute an etcd data store instance or a control plane instance.

The resolver installs an etcd data store instance into the sixth node in the cluster of ten nodes, and installs a control plane instance into the tenth node in the cluster of ten nodes because the sixth node satisfies the prerequisite to execute an etcd data store instance and the tenth node satisfies the prerequisite to execute a control plane instance. The sixth node executes an etcd data store instance, thereby reestablishing the etcd data store quorum, and the tenth node executes a control plane instance, thereby reestablishing the control plane high availability. Therefore, the system reinstates the continuous availability of cluster management for the cluster nodes, and the status monitor can indicate that the cluster transitioned from an impaired state to a high availability state.

The system provides an automated continuous manageability without waiting for manual intervention, which is therefore likely to be a preferred solution in many different circumstances, and also enables the system's provider in satisfying what might otherwise be difficult to satisfy service level agreements. The system improves a customer's experience by reducing the manual intervention in response to node failures and thus reducing support calls, thereby improving the customer's satisfaction.

Figure 2:
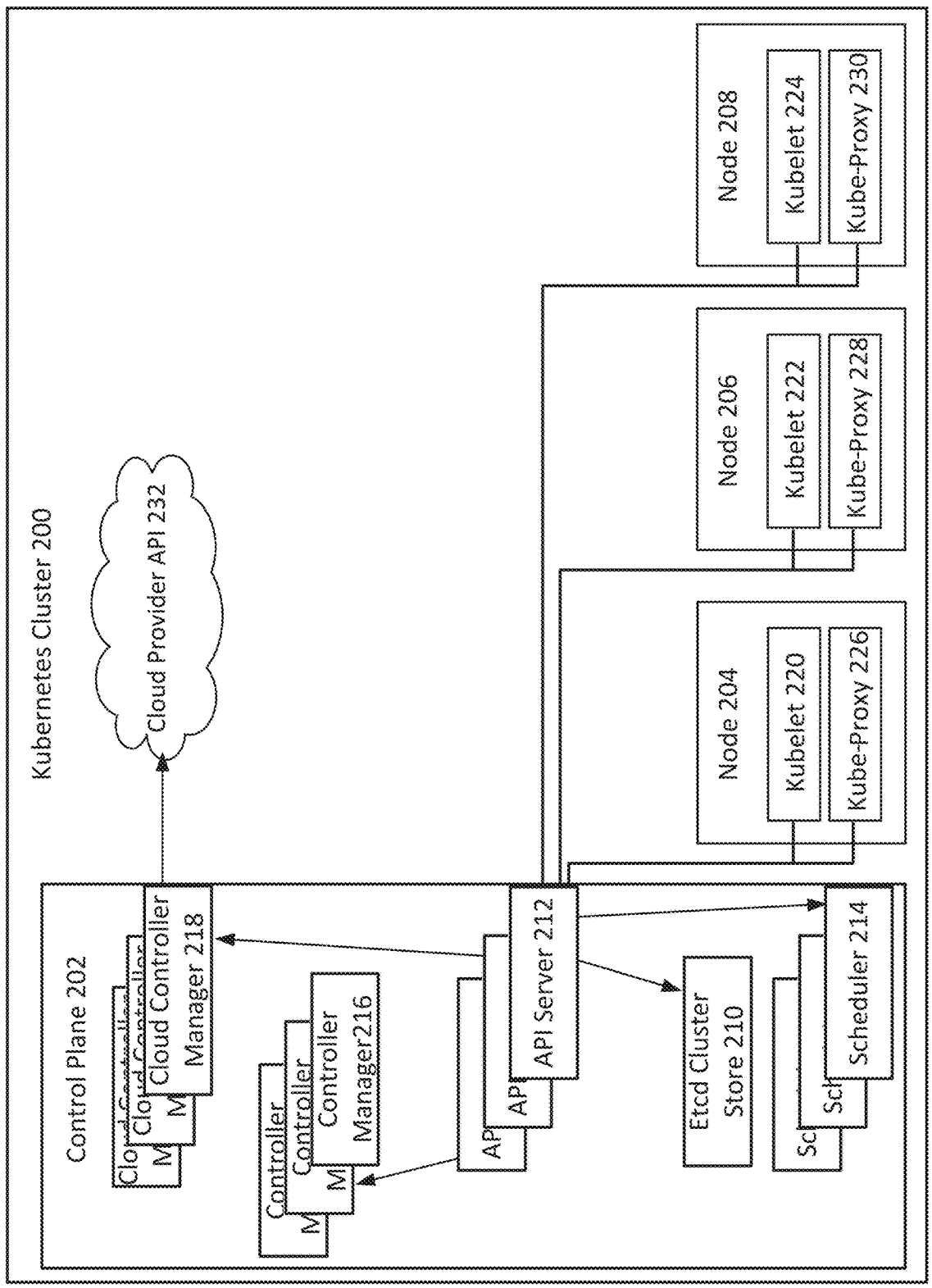
FIG. 2 illustrates a block diagram of an example Kubernetes cluster.

Kubernetes' components can manage an individual node in a Kubernetes cluster of nodes or be a part of a control plane, such as a master node that manages the Kubernetes cluster's workload and directs communication across the Kubernetes cluster. FIG. 2 depicts an example of a Kubernetes cluster 200. A Kubernetes control plane instance 202 consists of components that can both run on a single master node and run on multiple master nodes which manage high-availability Kubernetes clusters of servers, which are called worker nodes or nodes 204, 206, and 208, and which run containerized applications, and host pods which are components of the application workload.

The Kubernetes control plane instance 202 can include an etcd cluster store 210, at least one API server 212, at least one scheduler 214, at least one controller manager 216, and for at least one cloud controller manager 218 which manage various controllers. The nodes 204, 206, and 208 can include and correspond to Kublets 220, 222, and 224, Kube proxies 226, 228, and 230, respectively, and containers. If the cloud controller manager 218 is used, it interacts with a cloud provider API 232.

The etcd data store 210 is a consistent, highly available, lightweight, distributed key-value data store that retains all the configuration data of the Kubernetes cluster 200, and represents the overall state of the Kubernetes cluster 200 at a given point of time. The Application Programming Interface (API) server 212 is a component of the Kubernetes control plane instance 202 which exposes the Kubernetes API. The API server 212 is the front end for the Kubernetes control plane instance 202, and provides both the internal and external interfaces. The etcd data store instance 210 and the control plane instance 202 enable management of their cluster, in a process which may be referred to as cluster management.

Servers which execute Kubernetes control plane components may be referred to as master nodes. The Kubernetes control plane components may run on any of the nodes 204, 206, and 208 in the Kubernetes cluster 200, and make global decisions about the Kubernetes cluster 200, such as scheduling. The scheduler 214 is a component that watches for newly created pods which lack an assigned node, and schedules the nodes 204, 206, and 208 for the pods to run on. Factors considered for scheduling decisions include individual and collective resource requirements and availabilities, hardware and/or software/policy constraints, data locality, inter-workload interference, and deadlines.

The controller manager 216 is a component that runs controller processes. A controller drives the actual cluster state toward the desired state, as a controller for a resource is responsible for making the current state of the resource come closer to that desired state of the resource. The controller might carry an action out itself; or more commonly in a Kubernetes cluster, a controller will send messages to the API server 212 to create, update, and delete the resources that the controller manages.

Node components run on every node, maintaining running pods and providing the Kubernetes runtime environment. Each of the Kublets 220, 222, and 224 is an agent that runs on each of the nodes 204, 206, and 208 in the Kubernetes cluster 200, and is responsible for the running state of each of the nodes 204, 206, and 208, ensuring that all containers on the nodes 204, 206, and 208 are healthy, and making sure that containers are running in a pod. The Kube-proxies 226, 228, and 230 are network proxies that run on each of the nodes 204, 206, and 208 in the Kubernetes cluster 200, and route traffic to the appropriate container based on the IP address and the port number of the incoming request, thereby implementing part of the Kubernetes service concept, and maintaining network rules on the nodes 204, 206, and 208. These network rules allow network communication to the pods from network sessions from inside or outside of the Kubernetes cluster 200.

Each of the nodes 204, 206, and 208, also known as worker nodes 204, 206, and 208, is a machine where containers (workloads) are deployed. A container resides inside a pod, and holds the running application, libraries, and their dependencies. The container runtime is the software that is responsible for running containers.

The high availability deployment of a Kubernetes control plane requires at least two nodes hosting at least two control plane instances with load balancing and fail-over capabilities to support a fault tolerance of one, and an odd number, such as 3, 5, or 7, of nodes hosting etcd data store instances to support fault tolerances, such as 1, 2, or 3, respectively. This is because implementing high availability for an etcd data store is based on a quorum of etcd data store instances, which requires an odd number of nodes which host the etcd data store instances to effectively elect the leader. This means that a system needs a minimum of three nodes to support the high availability of a Kubernetes cluster with a fault tolerance of one, and a minimum of five nodes to support a fault tolerance of two, and so on.

The failure of a node can transition a Kubernetes cluster from a high availability state to an impaired or degraded state that is still available. Even if a node fails and the Kubernetes cluster loses the quorum of the etcd data store instances and the redundant control plane instance, the Kubernetes cluster remains operational and available in an impaired or degraded state. In an impaired state, the nodes of the Kubernetes cluster are still able to execute applications and store the applications' data but would be unable to function if an additional node failed which was executing a control plane or an etcd data store. Once any faulty nodes are replaced, the counts of nodes hosting etcd data store instances and the count of nodes hosting control plane instances are restored to their initial counts to transition the Kubernetes cluster from an impaired or degraded state back to a high availability state.

The high availability strategy of an application minimizes the downtime if an instance of the application fails because other instances of the same application can serve the request while the failed instance is being restarted. The quorum-based high availability strategy requires maintaining a pattern of 3, 5, 7, . . . instances, whereas the redundancy-based high availability strategy requires maintaining a pattern of 2, 3, 4, 5, . . . instances. Some data platforms may be composed of cloud-native microservices which could be stateless or stateful, such as an etcd data store instance, and a control plane instance. Some stateful services maintain their high availability state by forming a quorum of an odd number of service instances. For example, an active etcd data store requires three nodes hosting three etcd data store instances to support a fault tolerance of one, five nodes hosting five etcd data store instances to support a fault tolerance of two, seven nodes hosting seven etcd data store instances to support a fault tolerance of three, and so on.

A Kubernetes cluster may need to be partitioned into logical groups to increase resiliency and fault-tolerance. If the servers in a first server rack are grouped into a first fault domain, and the servers in a second server rack are grouped into a second fault domain, and so on, then the failure of any one fault domain does not impact any other fault domains due to their physical separation. Deduplication of data objects would occur within the context of each fault domain. Providers of multi-tenant systems requiring physical separation may consider creating fault domains, however this is not the primary purpose for creating fault domains.

A single Kubernetes cluster of servers may be spread across server racks and logically partitioned into fault domains in a way that the Kubernetes cluster of servers remains available even if a few servers or fault domains become unavailable. Using the quorum-based high availability strategy, a Kubernetes cluster can provide a fault tolerance (Faults To Tolerate, or FTT) of one for a data platform with three fault domains, a fault tolerance of two for a data platform with five fault domains, a fault tolerance of three for a data platform with seven fault domains, and so on. Some services such as a Kubernetes control plane's services maintain its high availability state with a redundant pair deployed as active-active or active-passive, combined with a load balancer to support failover.

If one or more nodes become unreachable by the Kubernetes control plane's API Server, the cluster's API provider will get a notification via a control-loop and eject any unreachable nodes, which may be referred to as failed nodes or faulty nodes, from the Kubernetes cluster and drain out faulty nodes to ensure that there is no workload running on these faulty nodes. The drain operation is performed via an external non-Kubernetes component. The Kubernetes cluster's API server can host an operating system agent via the API, assuming that the operating system is still running and accessible.

If the operating system is not running, then it assumed that no workload is running and there is no need to drain any failed nodes. The Kubernetes cluster's API server can power-off faulty nodes using a Dell Remote Access Controller (baseboard management controller) to ensure nothing is running on a failed node. The failed node alerts are provided to an administrator for service, and server LEDs are set to blinking via a Dell Remote Access Controller to help the administrator to identify faulty nodes.

If any of the ejected nodes were part of a master nodes pool, then the distributed system transitions the Kubernetes cluster state from a high availability state to an impaired or degraded state. A distributed system can function based on the following assumptions: each fault domain is one or more server racks, but all nodes from a server rack may not be used, and the same server rack cannot participate in two fault domains. Each fault domain may be configured with its own service level agreements for performance which are defined in terms such as throughput for backup and restore, measured in megabytes per second, input/output operations per second for instant access and instant restore, and different availability characteristics.

The status monitor runs as daemon set, through instances of its pods running on all nodes that are part of a Kubernetes cluster. The status monitor watches events such as Kubernetes node-related health events, etcd data store-health events, and hardware events, such as disk failures, network issues, and resource unavailability. The status monitor continuously determines if any of these events result in the loss of an etcd data store's quorum or the loss of a control plane's high availability. Consequently, the status monitor monitors and maintains the status of the etcd data store's quorum and the control plane's high availability. Given the intermittent nature of some of the issues where the event failure is short lived, the status monitor can wait for an appropriate duration, which may be a duration that is configured by a user, before attempting to identify the issue to the resolver.

The resolver also runs as a daemon set and watches the statuses maintained by the status monitor. When the resolver determines that the status monitor has identified the loss of an etcd data store's quorum or the loss of a control plane's high availability, the resolver's instances/pods running on each node will arrive at a consensus to elect the most suitable nodes at that time to take on the additional roles that had been satisfied by the failed nodes that no longer support the etcd data store's quorum or the control plane's high availability. The resolver may attempt to apply appropriate methods for rebuilding the quorum of the etcd data store by adding the role of the etcd data store to one or more nodes from the remaining nodes in the Kubernetes cluster to compensate for the count of the etcd data store' instances that failed.

Similarly, the resolver may attempt to apply appropriate methods for rebuilding the control plane's high availability by adding the role of the control plane to one or more nodes from the remaining nodes in the Kubernetes cluster to compensate for the count of the control plane's instances that failed. To compensate for the failure of a node which was executing a specific application for an etcd data store or a control plane, a remaining node needs to satisfy prerequisites to add and execute the etcd data store's role or the control plane's role. For example, a remaining node must have disks in a fully functioning condition, hardware that supports the specific application, and/or a capacity to accommodate an expected load of the specific application, without the remaining node having already been assigned the role of the specific application.

Since there are other nodes in the Kubernetes cluster that can accommodate the additional roles that were supported by failed nodes or failures in nodes, the resolver provides continuous availability for cluster management by reassigning the failed nodes' roles to other nodes in the Kubernetes cluster which can accommodate these roles. The resolver can reinstate the control plane's high availability or rebuild the etcd data store's quorum among existing nodes by rotation and/or reassignment of roles, without manual intervention and without disruption to the workload. For example, when reinstating high availability for a control plane, the resolver adds a master node role to a node which has sufficient capacity for control plane services without impacting the workloads that the node is typically handling.

The resolver can take nodes' historical events into consideration when proactively rotating the assignment of such roles to the various nodes. The resolver can make decisions based on the initial event(s) in the pattern, such as every time one node fails, it is coincidentally followed by failure of one or more other nodes. The resolver takes the repetition of such combinations into consideration for selecting appropriate nodes to which the role needs to be rotated. A user can configure the threshold for repetition in the historical patterns. This reassignment of roles to nodes that can execute a control plane instance, or an etcd data store instance is done on a best effort basis, and is subject to availability of suitable node(s) at a given moment, as the resolver will continue to retry periodically until suitable node(s) are found.

If there are multiple fault domains, and if a node failure happens within one fault domain that results in the loss of a control plane's high availability and/or an etcd data store's quorum, the resolver will prefer to reassign the role of the failed node to one of the remaining nodes within the same fault domain, if available. If all nodes in a fault domain become unreachable, the resolver will handle this event as a potential network partitioning case that will require user intervention. A fault domain can be a network of computers and devices that are controlled by a set authority and have specific guidelines for the retention of data.

Figure 3:
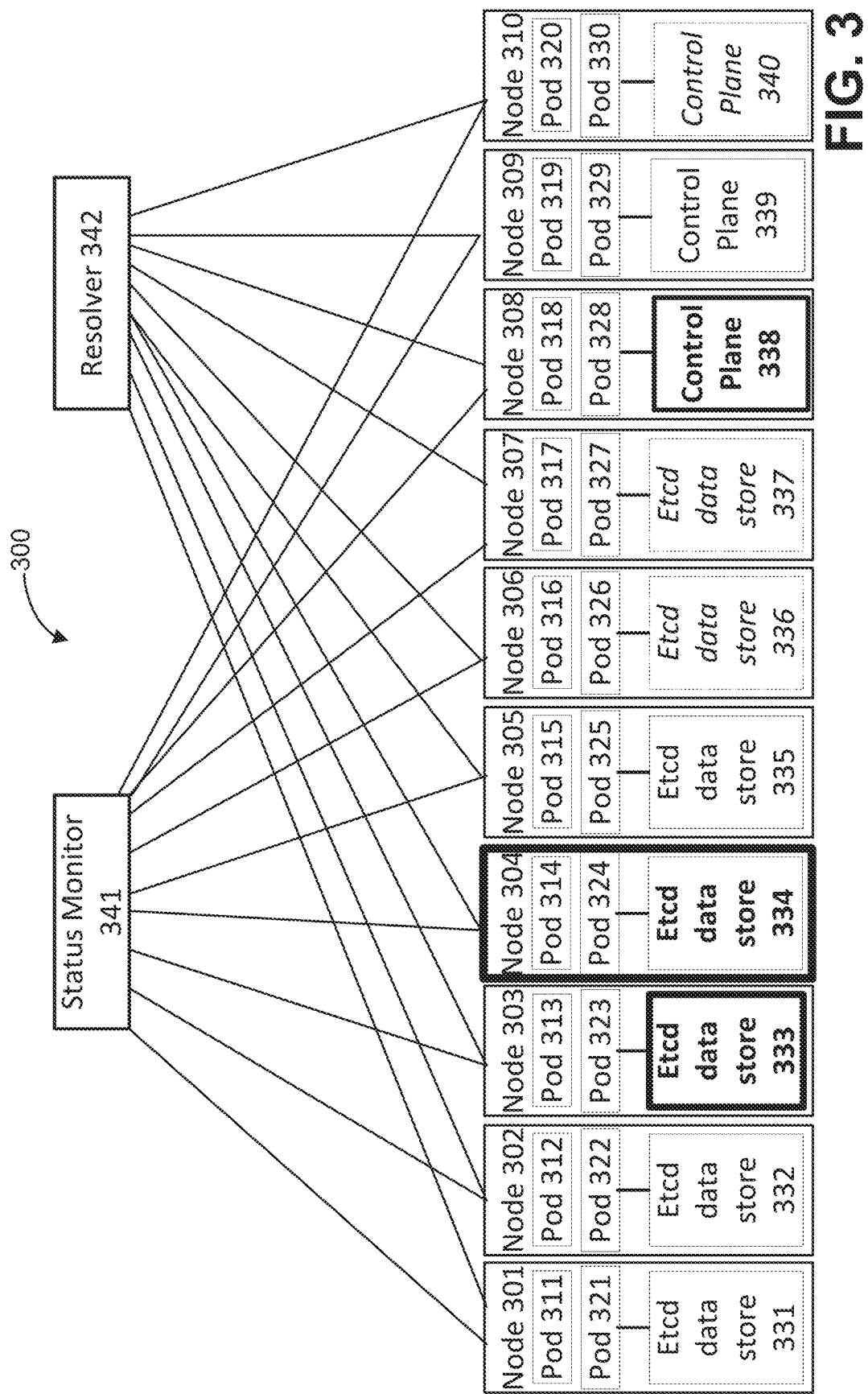
FIG. 3 illustrates a block diagram of example Kubernetes components which also includes a status monitor and a resolver for continuous manageability of Kubernetes clusters under an embodiment.

A part 300 of a Kubernetes cluster depicts a scenario of an etcd data store's loss of a quorum, a control plane's loss of high availability, and the attempt to rebuild the quorum and the high availability, as illustrated in FIG. 3. The part 300 of the Kubernetes cluster includes ten nodes 301-310, twenty pods 311-330, seven available or failed etcd data store instances 331-337, three available or failed control plane instances 338-340, one status monitor 341, and one resolver 342.

One depicted scenario includes the possibility of an entire node failing, just an etcd data store instance failing, or both an entire node and an etcd data store instance failing, while the remaining workload on the supporting nodes remains intact. This situation is reflected in the status maintained by the status monitor 341, as the resolver 342 watching this status identifies the failure to communicate by the etcd data store instance 333 in the third node 303 and the failure of the fourth node 304 which hosts the etcd data store instance 334. The status monitor 341 runs as a daemon set and has access to the status of an etcd data store's quorum and a control plane's high availability through instances of its pods running on all nodes 301-310 that are part of the Kubernetes cluster 300.

An active etcd data store 331 specifies that the third node 303 hosted the etcd data store instance 333 that enabled continuous availability of cluster management for the Kubernetes cluster nodes, until the etcd data store instance 333 failed, and that the fourth node 304 hosted the etcd data store instance 334 that enabled continuous availability of cluster management for the Kubernetes cluster nodes, until the fourth node 304 failed. While waiting for an administrator to replace any faulty nodes with new or repaired nodes, the status monitor 341 examines the impact of the failure in the third node 303 and of the fourth node 304 on the original etcd data store instances 331-335 and the original control plane instances 338-339, which may be spread across fault domains. If the current count of the available instances of the available etcd data store instances 331, 332, and 335 is lower than the desired level required (a minimum of five etcd data store instances for a fault tolerance of two) for high availability, the status monitor 341 marks the Kubernetes cluster state as impaired or degraded.

The resolver 342 also runs as a daemon set and responds to each status provided via the status monitor 341 by the resolver's instances/pods running on each of the nodes 301-310, which will arrive at a consensus about which of the eight remaining nodes in the Kubernetes cluster of ten nodes satisfies a prerequisite to execute an additional etcd data store instance. If an insufficient number of nodes in one fault domain satisfies the prerequisite(s), the resolver 342 will try to identify the next available qualified node anywhere in the Kubernetes cluster. Eventually, the resolver 342 finds an available node in the same or another fault domain and can reassign the etcd data store instances within or across the available fault domains. The resolver 342 creates additional etcd data store instances as necessary on nodes that satisfy the prerequisite(s), if available.

Then the resolver 342 installs the etcd data store instance 336 into the sixth node 306 in the Kubernetes cluster 300 of ten nodes 301-310, and installs the etcd data store instance 337 into the seventh node 307 in the Kubernetes cluster 300 of ten nodes 301-310 because the sixth node 306 and the seventh node 307 satisfy the prerequisites to execute the etcd data store instances 336 and 337. The sixth node 306 executes the etcd data store instance 336 and the seventh node 307 executes the etcd data store instance 337, thereby reestablishing the quorum of five etcd data store instances, which enables each of the etcd data store instances 331, 332, and 335-337 to be continuously available for cluster management by the Kubernetes cluster nodes. The status monitor 341 identifies that the replacement nodes 306 and 307 executed the newly installed etcd data store instances 336 and 337 which reestablished its quorum. Since the count of five active etcd data store instances 331, 332, and 335-337 have reached the desired levels to reestablish its original quorum of five, then the status monitor 341 transitions the Kubernetes cluster state from an impaired or degraded state back to a high availability state.

Another depicted scenario is reflected in the status maintained by the status monitor 341, as the resolver 342 watches this status to identify the failure of the eighth node 308 which hosts the control plane 338. The status monitor 341 accesses an active etcd data store 331 which specifies that the eighth node 308 hosted the control plane 338 which enabled continuous availability of cluster management for the Kubernetes cluster nodes until the eighth node 308 failed. While waiting for an administrator to replace any faulty nodes with new or repaired nodes, the status monitor 341 examines the impact of the failure of the eighth node 308 on the control plane instances 338 and 339 which may be spread across fault domains. If the current count of the one available control plane instance 339 is lower than the desired level required (a minimum of two redundant control plane instances 338 and 339 for high availability), the status monitor 341 marks the Kubernetes cluster 300 state as impaired or degraded.

The resolver 342 responds to each status provided via the status monitor 341 by the resolver's instances/pods running on each of the nodes 301-310, which will arrive at a consensus about which of the nine remaining nodes 301-307, 309, and 310 in the Kubernetes cluster 300 of ten nodes 301-310 satisfies a prerequisite to execute a control plane instance. If an insufficient number of nodes in one fault domain satisfies the prerequisite(s), the resolver 342 will try to identify the next available qualified node anywhere in the Kubernetes cluster 300. Eventually, the resolver 342 finds an available node 310 in the same or another fault domain and can reassign a control plane instance 340 within or across the available fault domains. The resolver 342 creates additional control plane instances 340 as necessary on nodes, such as node 310, that satisfy the prerequisite(s), if available.

Then the resolver 342 installs a control plane instance 340 into the tenth node 310 in the Kubernetes cluster 300 because the tenth node 310 satisfies the prerequisites to execute a control plane instance. The tenth node 310 executes the control plane instance 340, thereby reestablishing the high availability redundancy of two control plane instances 339 and 340, which makes two control plane instances 339 and 340 continuously available for cluster management by the Kubernetes cluster nodes. The status monitor 341 identifies that the replacement node 310 executed the control plane instance 340 which reestablished the control plane high availability. Since the count of two available control plane instances 339 and 340 has reached the desired levels to reestablish high availability, then the status monitor 341 transitions the Kubernetes cluster 300 state from an impaired or degraded state back to a high availability state.

If a fault domain fails in a multi-domain configuration, then a Kubernetes cluster 300 may lose the quorum needed for the etcd data store instances and lose the high availability for the redundant control plane instance, but the Kubernetes cluster 300 may remain operational and available in an impaired or degraded state. The response to a fault domain failure is similar to the response to a node failure, with the exception that all nodes of a fault domain are failed due to a rack level failure, and the fault domain is marked as deleted instead of degraded.

Figure 4:
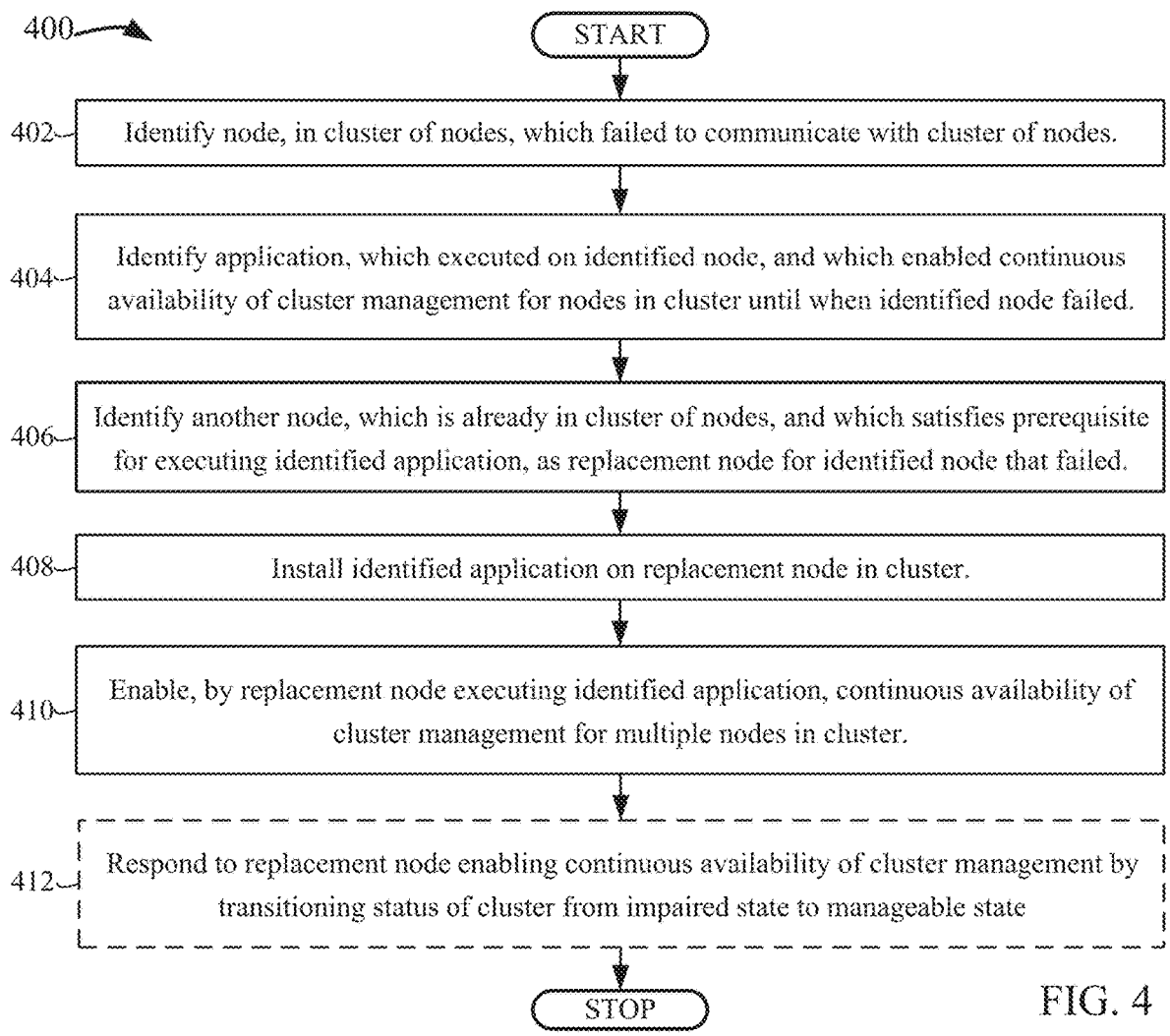
FIG. 4 is a flowchart that illustrates an example method for continuous manageability of Kubernetes clusters under an embodiment.

FIG. 4 is a flowchart that illustrates a method for continuous manageability of Kubernetes clusters in an embodiment. Flowchart 400 depicts method acts illustrated as flowchart blocks for certain steps involving the client device 106, the primary data storage platform 108, and/or the secondary data storage platform 110 of FIG. 1. The description below of the blocks in the flowchart 400 includes references to the Kubernetes cluster 300, the nodes 301-310, the etcd data store instances 331-337 and the control plane instances 338-340, the status monitor 341, and the resolver 342, as depicted in FIG. 3.

A node is identified, in a cluster of nodes, which failed to communicate with the cluster of nodes, block 402. The system identifies a loss of communication between a node (or an application in a node) and a Kubernetes cluster of nodes. For example, and without limitation, this can include the status monitor 341 identifying that the fourth node 304 and the eighth node 308 in a Kubernetes cluster 300 of ten nodes 301-310 have failed to communicate a heartbeat signal periodically to the Kubernetes cluster 300 to confirm that the fourth node 304 and the eighth node 308 are available for cluster membership. A node can be one of several computers linked on a network. A cluster can be several computers linked on a network and implemented like an individual entity.

After identifying a node that failed to communicate with a Kubernetes cluster, an application is identified, which executed on the identified node, and which enabled continuous availability of cluster management for nodes in the cluster until when the identified node failed, block 404. The identified application can be a container control services application or a cluster data store application. A cluster data store instance can enable identifying an application which enabled continuous availability of cluster management for the nodes in a Kubernetes cluster 300 until when the identified node failed. The system identifies applications which a failed node had been executing to enable access to cluster management for the cluster's nodes. By way of example and without limitation, this can include the status monitor 341 accessing the etcd data store instance 331, which specifies that the fourth node 304 hosted an etcd data store instance 334 that enabled continuous availability of cluster management for the Kubernetes cluster nodes before the fourth node 304 failed, and that the eighth node 308 hosted a control plane instance 338 that enabled continuous availability of cluster management for the Kubernetes cluster nodes before the eighth node 308 failed.

An application can be a program that executes automated tasks. An identified node can be a selected one of several computers linked on a network. Continuous availability can be an uninterrupted ability of a user to access information or resources. Cluster management can be the responsibility for, and control of, several computers linked on a network and implemented like an individual entity.

A container control services application can be a program that automates software deployment, scaling, and management for programs that execute a particular task or set of tasks for storing copies of data objects. A cluster data store application can be a program that executes a particular task or set of tasks for a structured set of computer accessible information referenced by several computers linked on a network and implemented like an individual entity. An instance can be a specific realization of an object. A cluster data store can be a structured set of computer accessible information referenced by several computers linked on a network and implemented like an individual entity.

Identifying an application which enabled continuous availability of cluster management until when an identified node failed may be based on comparing a count of each instance of the application which is currently hosted by a functional node against a count of instances of the application which is required by a high availability strategy. For example, the status monitor 341 determines that the high availability strategy of redundancy for a control plane requires two control plane instances 338 and 339 to be installed on two nodes, such as nodes 308 and 309 in the Kubernetes cluster 300, but only one node 309 of the two nodes 308 and 309 that installed the two control plane instances 338 and 339 is currently functional. In another example, the status monitor 341 determines that the high availability strategy of a quorum for the etcd data store requires five etcd data store instances 331-335 to be stored on any five nodes, such as the nodes 301-305 in the Kubernetes cluster 300, but only four nodes 301-303 and 305 of the five nodes 301-305 that installed the five etcd data store instances 331-335 are currently functional.

A count can be a total number of something. A functional node can be one of several computers linked on a network which is operating within normal operating parameters. A high availability strategy can be a policy to increase accessibility.

When one node 308, which had been executing one control plane instance 338 of the two control plane instances 338-339, failed and therefore is no longer able to execute the control plane instance 338, then the control plane instance 338 can no longer enable continuous availability of cluster management for nodes 301-310 in the Kubernetes cluster 300. In another example, the status monitor 341 determines that the high availability strategy of an etcd data store quorum requires five etcd data store instances 331-335 to be installed on any five nodes, such as the five nodes 301-305 in the Kubernetes cluster 300. When the node 304, which had been executing one etcd data store instance 334 of the five etcd data store instances 331-335, failed and therefore is no longer able to execute the etcd data store instance 334, then the etcd data store instance 334 can no longer enable continuous availability of cluster management for the nodes 301-310 in the Kubernetes cluster 300.

Following the identification of a failed node and its application, which enabled continuous availability of cluster management for Kubernetes cluster nodes until when the identified node failed, another node is identified, which is already in the cluster of nodes, and which satisfies a prerequisite for executing an identified application, as a replacement node for the identified node that failed, block 406. The system identifies a node which is already in the Kubernetes cluster and which can execute the identified application that was hosted by the failed node. In embodiments, this can include the resolver 342 identifying which of the eight remaining nodes in the Kubernetes cluster of ten nodes 301-310 satisfies a prerequisite to execute the failed etcd data store 334 or the failed control plane 338. Examples of a prerequisite for a remaining node to be executing the identified application may include the remaining node having disks in a fully functioning condition, hardware that supports the identified application, and/or a capacity to accommodate an expected load of the identified application, without having already been assigned the role of the identified application.

An other node can be an alternative computer relative to one specific computer of several computers linked on a network. A prerequisite can be a prior condition for something else to happen. A replacement node can be a substitute computer for one specific computer of several computers linked on a network.

A disk can be a hard or floppy round, flat, and magnetic platter capable of having information read from and written to. A fully functioning condition can be all components of a system operating within normal operating parameters. Hardware can be a computer's tangible components or delivery systems that store and run the written instructions provided by the software.

A capacity can be the maximum amount that something can contain. An expected load can be a projected capacity. A role can be the function assumed or part played by a thing in a particular situation.

Since a replacement node, in the Kubernetes cluster of nodes, satisfies a prerequisite to execute the identified application, the identified application is installed on the replacement node, block 408. The system uses any of the Kubernetes cluster's remaining nodes required to replace the node that failed by installing the failed node's application on a replacement node in the Kubernetes cluster. For example, and without limitation, this can include the resolver 342 installing the etcd data store instance 336 into the sixth node 306 in the Kubernetes cluster 300 of ten nodes 301-310, and installing the control plane instance 340 into the tenth node 310 in the Kubernetes cluster 300 of ten nodes 301-310 because the sixth node 306 satisfies the prerequisite to execute an etcd data store instance and the tenth node 310 satisfies the prerequisite to execute a control plane instance.

The replacement node may be an existing node in either the same fault domain, which corresponds to the same server rack, as the identified node that failed, or a different fault domain, which corresponds to a different server rack, than the identified node that failed. For example, the sixth node 306 and the tenth node 310 are replacement nodes that are in the same fault domain, and therefore, share a server rack, with the fourth node 304 and the eighth node 308, which are the failed nodes. An existing node can be one of several computers, which are in operation at the time under consideration, and which are linked on a network.

The same fault domain can be a commonly shared network of computers and devices that are controlled by a set authority and have specific guidelines for the retention of data. A different fault domain can be physically separated networks of computers and devices that are controlled by different set authorities and have specific guidelines for the retention of data. A same server rack can be a commonly shared supporting framework that holds hardware modules for a computer that executes computer programs which assist client devices in storing copies of data objects for retention within dedicated files. A different server rack can be physically separated supporting frameworks that hold hardware modules for computers that execute computer programs which assist client devices in storing copies of data objects for retention within dedicated files.

Having the identified application installed on a replacement node in the Kubernetes cluster of nodes, the replacement node executes the identified application, which enables continuous availability of cluster management by multiple nodes in the Kubernetes cluster, block 410. The system enables the replacement nodes in the Kubernetes cluster to execute the failed nodes' applications. By way of example and without limitation, this can include the sixth node 306 executing the etcd data store instance 336, thereby reestablishing the etcd data store quorum, and the tenth node 310 executing the control plane instance 340, thereby reestablishing the control plane high availability. Each reestablishment of a high availability strategy enables continuous availability of cluster management for multiple Kubernetes cluster nodes.

After a replacement node enables continuous availability of cluster management, a status of the cluster is transitioned from an impaired state to a manageable state, block 412. The system identifies that the Kubernetes cluster state is transitioned from an impaired state back to a high availability state. In embodiments, this can include the status monitor 341 responding to the replacement nodes 306 and 310 reestablishing the etcd data store quorum and the control plane high availability, which enable continuous availability of cluster management for cluster nodes, by transitioned the status of the Kubernetes cluster from an impaired state or a degraded state to a fully manageable state.

A status can be the relative standing of something. An impaired state can be the particular condition that something, which is diminished in function or ability, is in at a specific time. A manageable state can be the particular condition that something, which can be controlled without great difficulty, is in at a specific time.

Although FIG. 4 depicts the blocks 402-412 occurring in a specific order, the blocks 402-412 may occur in another order. In other implementations, each of the blocks 402-412 may also be executed in combination with other blocks and/or some blocks may be divided into a different set of blocks.

Even though this Kubernetes system is described in the context of a PowerProtect scale-out, the system can leverage the underlying concepts for other Kubernetes-based options. Although the following paragraphs describe Dell Corporation's PowerProtect® backup/restore application, Dell Corporation's NetWorker® backup/restore application, and Dell Corporation's Avamar® backup/restore application as examples of the backup/restore application 102, the backup/restore application 102 may be another type of backup/restore application which provides the backup/restore functionalities described in the Background section. A backup server may be another type of backup server which provides the backup/restore functionalities described in the Background section.

The backup/restore application 102 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier one storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 102 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 102 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types.

The backup/restore application 102 may use different policies for various data protection levels, such as a "gold" policy for VMware® clients, a "platinum" policy for UNIX® clients, and a "silver" policy for Windows® clients. The gold policy can specify to store two backup copies for each VMware® client's application resources onto the first disk for six months, store a primary clone of the backup copies onto the second disk for one year, and store a secondary clone of the backup copies onto a tape for five years. In another example, a policy can provide redundancy by specifying to replicate each full backup copy to three different backups servers, replicate each incremental cumulative backup copy and each incremental differential backup copy to two different backup servers, replicate each archive log backup copy to an additional backup server, and relocate each full backup copy created at the end of the month to cloud tiering for long term retention. Backup copies stored in the cloud tiering have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can include the target storage device where backup copies are stored.

Figure 5:
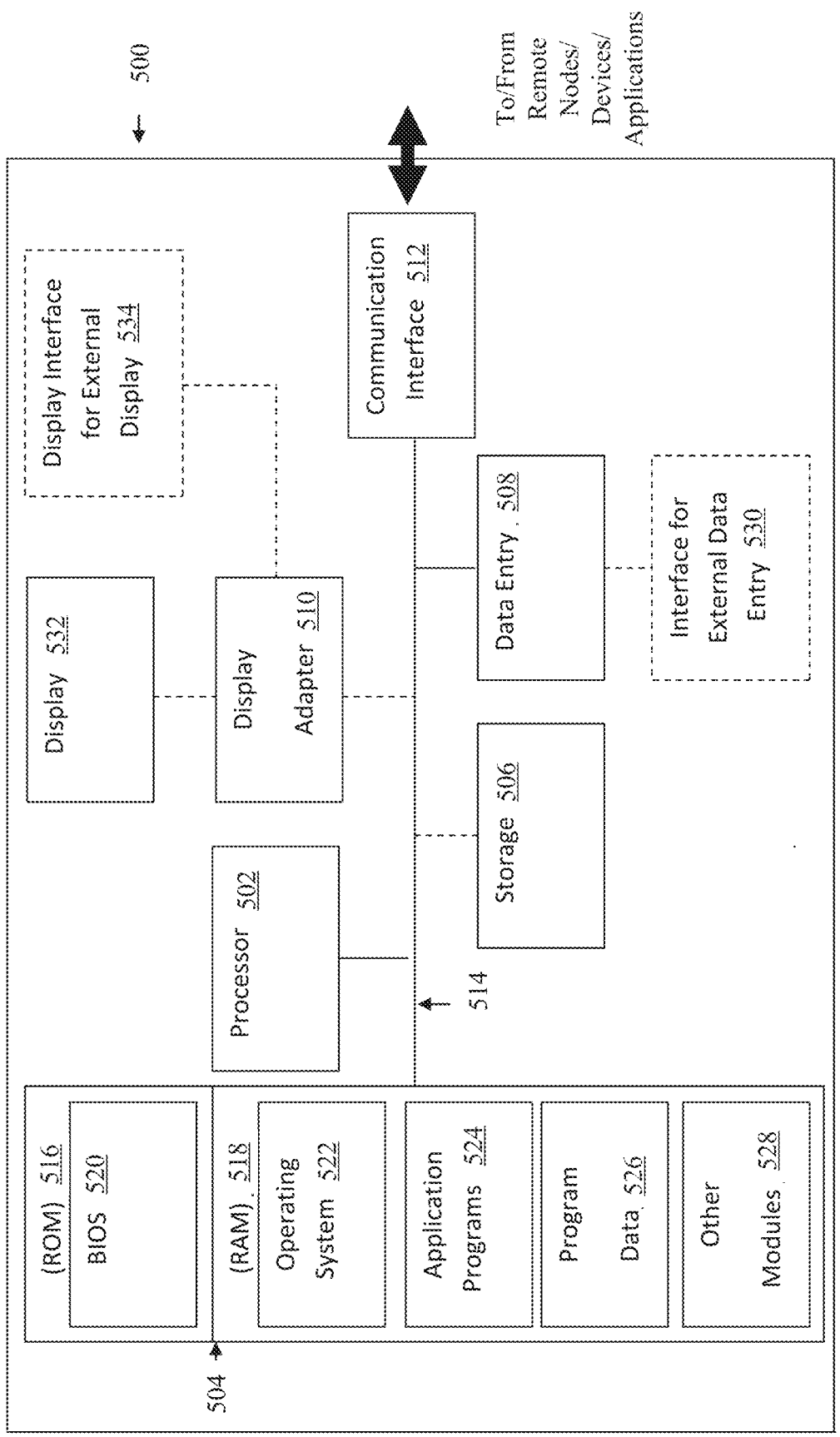
FIG. 5 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random-access memory (RAM) 518. The memory 504 may be configured to store program instructions and data during operation of the hardware device 500. In various embodiments, the memory 504 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 500. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device, or other common network node, and typically includes many or all the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

The arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it. The computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for continuous manageability of Kubernetes clusters, comprising:
   one or more processors; and
   a non-transitory computer readable medium storing a plurality of instructions, which when executed, cause the one or more processors to:
   identify a node, in a cluster of nodes, which failed to communicate with the cluster of nodes;
   identify an application, which executed on the identified node, and which enabled continuous availability of cluster management for nodes in the cluster until when the identified node failed;
   identify an other node, which is already in the cluster of nodes, and which satisfies a prerequisite for executing the identified application, as a replacement node for the identified node that failed;
   install the identified application on the replacement node in the cluster; and
   enable, by the replacement node executing the identified application, continuous availability of cluster management for multiple nodes in the cluster.

2. The system of claim 1, wherein the plurality of instructions further causes the one or more processors to respond to the replacement node enabling continuous availability of cluster management by transitioning a status of the cluster from an impaired state to a manageable state.

3. The system of claim 1, wherein the identified application comprises one of a container control services application or a cluster data store application.

4. The system of claim 1, wherein an instance of a cluster data store enables identifying the application which enabled continuous availability of cluster management for the nodes in the cluster until when the identified node failed.

5. The system of claim 1, wherein identifying the application, which enabled continuous availability of cluster management until when the identified node failed, is based on comparing a count of each instance of the application which is currently hosted by a functional node against a count of instances of the application which is required by a high availability strategy.

6. The system of claim 1, wherein the other node satisfying the prerequisite to execute the identified application is based on the other node having at least one of disks in a fully functioning condition, hardware that supports the identified application, or a capacity to accommodate an expected load of the identified application, without having already been assigned a role of the identified application.

7. The system of claim 1, wherein the replacement node comprises an existing node in one of a same fault domain, corresponding to a same server rack, as the identified node that failed, or a different fault domain, corresponding to a different server rack, than the identified node that failed.

8. A computer-implemented method for continuous manageability of Kubernetes clusters, the computer-implemented method comprising:
   identifying a node, in a cluster of nodes, which failed to communicate with the cluster of nodes;
   identifying an application, which executed on the identified node, and which enabled continuous availability of cluster management for nodes in the cluster until when the identified node failed;
   identifying an_other node, which is already in the cluster of nodes, and which satisfies a prerequisite for executing the identified application, as a replacement node for the identified node that failed;
   installing the identified application on the replacement node in the cluster; and
   enabling, by the replacement node executing the identified application, continuous availability of cluster management for multiple nodes in the cluster.

9. The computer-implemented method of claim 8, wherein the computer-implemented method further comprises responding to the replacement node enabling continuous availability of cluster management by transitioning a status of the cluster from an impaired state to a manageable state.

10. The computer-implemented method of claim 8, wherein the identified application comprises one of a container control services application or a cluster data store application.

11. The computer-implemented method of claim 8, wherein an instance of a cluster data store enables identifying the application which enabled continuous availability of cluster management for the nodes in the cluster until when the identified node failed.

12. The computer-implemented method of claim 8, wherein identifying the application which enabled continuous availability of cluster management until when the identified node failed is based on comparing a count of each instance of the application which is currently hosted by a functional node against a count of instances of the application which is required by a high availability strategy.

13. The computer-implemented method of claim 8, wherein the other node satisfying the prerequisite to execute the identified application is based on the other node having at least one of disks in a fully functioning condition, hardware that supports the identified application, or a capacity to accommodate an expected load of the identified application, without having already been assigned a role of the identified application.

14. The computer-implemented method of claim 8, wherein the replacement node comprises an existing node in one of a same fault domain, corresponding to a same server rack, as the identified node that failed, or a different fault domain, corresponding to a different server rack, than the identified node that failed.

15. A computer program product, comprising a non-transitory computer-readable medium having a computer-readable program code embodied therein to be executed by one or more processors, the program code including instructions to:

identify a node, in a cluster of nodes, which failed to communicate with the cluster of nodes;

identify an application, which executed on the identified node, and which enabled continuous availability of cluster management for nodes in the cluster until when the identified node failed;

identify an other node, which is already in the cluster of nodes, and which satisfies a prerequisite for executing the identified application, as a replacement node for the identified node that failed;

install the identified application on the replacement node in the cluster; and enable, by the replacement node executing the identified application, continuous availability of cluster management for multiple nodes in the cluster.

16. The computer program product of claim 15, wherein the program code includes further instructions to respond to the replacement node enabling continuous availability of cluster management by transitioning a status of the cluster from an impaired state to a manageable state.

17. The computer program product of claim 15, wherein the identified application comprises one of a container control services application or a cluster data store application, and an instance of a cluster data store enables identifying the application which enabled continuous availability of cluster management for the nodes in the cluster until when the identified node failed.

18. The computer program product of claim 15, wherein identifying the application which enabled continuous availability of cluster management until when the identified node failed is based on comparing a count of each instance of the application which is currently hosted by a functional node against a count of instances of the application which is required by a high availability strategy.

19. The computer program product of claim 15, wherein the other node satisfying the prerequisite to execute the identified application is based on the other node having at least one of disks in a fully functioning condition, hardware that supports the identified application, or a capacity to accommodate an expected load of the identified application, without having already been assigned a role of the identified application.

20. The computer program product of claim 15, wherein the replacement node comprises an existing node in one of a same fault domain, corresponding to a same server rack, as the identified node that failed, or a different fault domain, corresponding to a different server rack, than the identified node that failed.

* * * * *